(12) United States Patent
Morita

(10) Patent No.: US 8,148,638 B2
(45) Date of Patent: Apr. 3, 2012

(54) CORD ACCOMMODATION MEMBER FOR TELEVISION ENTERTAINMENT SHELF AND ITS MANUFACTURING METHOD

(75) Inventor: Yuusuke Morita, Osaka (JP)

(73) Assignee: Panasonic Corporation, Osaka (JP)

( * ) Notice: Subject to any disclaimer, the term of this patent is extended or adjusted under 35 U.S.C. 154(b) by 396 days.

(21) Appl. No.: 12/444,437

(22) PCT Filed: Dec. 11, 2007

(86) PCT No.: PCT/JP2007/073812
§ 371 (c)(1),
(2), (4) Date: Apr. 6, 2009

(87) PCT Pub. No.: WO2008/075583
PCT Pub. Date: Jun. 26, 2008

(65) Prior Publication Data
US 2010/0105242 A1   Apr. 29, 2010

(30) Foreign Application Priority Data

Dec. 21, 2006 (JP) ................................. 2006-344078

(51) Int. Cl.
*A47B 97/00* (2006.01)
*A47B 17/00* (2006.01)
*A47B 13/00* (2006.01)

(52) U.S. Cl. ....... 174/68.1; 174/135; 174/101; 174/504; 174/68.3; 174/96; 174/99 R; 174/100

(58) Field of Classification Search ............... 264/328.1; 147/135, 101, 504, 68.1, 68.3, 96, 99 R, 100; 174/135, 101, 504, 68.1, 68.3, 96, 99 R, 100; A47B 13/00, 17/00, 97/00; F16B 2/12
See application file for complete search history.

(56) References Cited

U.S. PATENT DOCUMENTS 6,996,904 B1 * 2/2006 Howell ........................... 29/868
7,687,716 B2 * 3/2010 Pepe et al. ..................... 174/101
7,952,023 B2 * 5/2011 Caveney et al. ............. 174/68.1
(Continued)

FOREIGN PATENT DOCUMENTS
JP            61-085705 U    6/1986
(Continued)

OTHER PUBLICATIONS

Machine translation JP2002262944, Osato, Sep. 2002.*

Primary Examiner — Quyen Leung
Assistant Examiner — Terrance Kenerly
(74) *Attorney, Agent, or Firm* — RatnerPrestia

(57) ABSTRACT

A cord accommodation member is able to easily accommodate a connecting cord for a thin TV and video equipment in a hidden place under a glass shelf, having a hard-to-fall-off structure, and can be cut in the desired size for each type in order to cope with the development of various types different in lateral width, without need of raising the die every type, and its manufacturing method. The cord accommodation member comprises a cord accommodating portion for accommodating a connecting cord, a fixing arm for fixing the cord accommodating portion, which is attached to a glass shelf of a TV stand for mounting a television and video equipment, and a fixing rubber for increasing the fixing force for the glass shelf and the fixing arm.

6 Claims, 9 Drawing Sheets

U.S. PATENT DOCUMENTS

| | | | |
|---|---|---|---|
| 2002/0012242 A1* | 1/2002 | Lecinski et al. | 361/827 |
| 2005/0229526 A1* | 10/2005 | Rivers et al. | 52/519 |
| 2006/0011380 A1* | 1/2006 | Pierce | 174/135 |
| 2006/0102381 A1* | 5/2006 | Conrad | 174/135 |
| 2006/0254793 A1* | 11/2006 | Santos Lopez et al. | 174/36 |

FOREIGN PATENT DOCUMENTS

| | | |
|---|---|---|
| JP | 2002-262944 A | 9/2002 |
| JP | 2004-320427 A | 11/2004 |
| JP | 3107053 U | 11/2004 |
| WO | WO2005112198 | * 11/2005 |

* cited by examiner

CORD ACCOMMODATION MEMBER FOR TELEVISION ENTERTAINMENT SHELF AND ITS MANUFACTURING METHOD

This application is a U.S. National Phase Application of PCT International Application PCT/JP2007/073812.

TECHNICAL FIELD

The present invention relates to a cord accommodation member used for accommodating a cord between apparatuses connected to peripheral equipment such as DVD and VTR, wherein a thin type TV using a plane display such as a plasma display panel and liquid crystal panel is mounted on a stand, and its manufacturing method.

BACKGROUND ART

Recently, in the field of TV equipment, as the screen becomes larger in size, there is a rapidly increasing demand for enjoying the pictures by using many digital equipment such as DVD and VTR as well as a thin type TV using a plasma display panel and liquid crystal panel. The most significant feature of such a thin type TV is that the size is reduced in depth even in case of a large screen. As styling of a TV stand for making the most of the feature of a thin type TV, the development and sale of an open type stand using glass shelves are rapidly prevailing and increasing.

Such an open type stand is marketed from each maker, which is used to mount a thin type TV and in many cases connected to equipment such as DVD. And, as to products such as crampers for bundling a cord which is absolutely necessary for connection to equipment, various types have been already developed and marketed.

In the case of a stand for a CRT type television, the cord is often bundled and hidden behind component parts placed in the stand because it is not an open type, and the user will not see it even when much dust is deposited therein. On the other hand, in the case of an open type stand, it is unable to put the cord behind component parts. Accordingly, the cord is bundled by using a cord cramper or the like in many cases when an open type stand is used. Therefore, many types of members for easy bundling of cord are commercially available. Such members are disclosed, for example, in Patent document 1.

Cord can be easily bundled by using a cord cramper disclosed in Patent document 1, but it is unable to accommodate the cord itself. It is structurally possible to cover the whole so that the cord is not visible. In this structure, the cover cannot be hidden but it is possible to eliminate a disorderly image from the appearance point of view. Also, the problem of dust deposition can be solved.

However, although it is possible to avoid an disorderly appearance due to exposure of the cord, such a structure of covering the whole includes portions externally protruded, and the cover itself is exposed the same as before, allowing the disorderly status to still remain. Also, the cover itself is an unstable existence in terms of shape.

Also, another problem in connecting a thin type TV to peripheral equipment is such that it is necessary to make an accommodating portion in an inconspicuous place for each type in order to cope with the development of various types such as 58 type, 50 type, 42 type, and 37 type. To cope with such various types, the cost of dies and the number of types will be increased.

Patent document 1: Unexamined Japanese Utility Model Publication S61-85705

DISCLOSURE OF INVENTION

The present invention provides a cord accommodation member which is able to accommodate a connecting cord for a thin type TV and video equipment in a hidden space under a glass shelf and to cope with the development of various types different in width by forming the accommodating portion by extrusion molding and by cutting it in the desired size for each type, and its manufacturing method.

Also, the present invention provides an accommodation member which can be easily installed at the rear bottom of the middle shelf and is structurally hard to fall off, and its manufacturing method.

The cord accommodation member is a cord accommodation member for accommodating a connecting cord for connecting between a television and video equipment, and comprises a cord accommodating portion for accommodating a connecting cord, a fixing arm for fixing the cord accommodating portion, which is attached to a glass shelf of a TV stand on which the television and the video equipment are mounted, and a fixing rubber for increasing force of fixing between the glass shelf and the fixing arm.

The manufacturing method for the cord accommodation member is a manufacturing method for the cord accommodation member for accommodating a connecting cord for connecting between a television and a video equipment, comprising forming simultaneously a cord accommodating portion of the cord accommodation member, resin of a fixing arm, and a fixing rubber by injection molding, and cutting the cord accommodation member formed by injection molding in a predetermined length

DESCRIPTION OF REFERENCE MARKS

Figure 1:
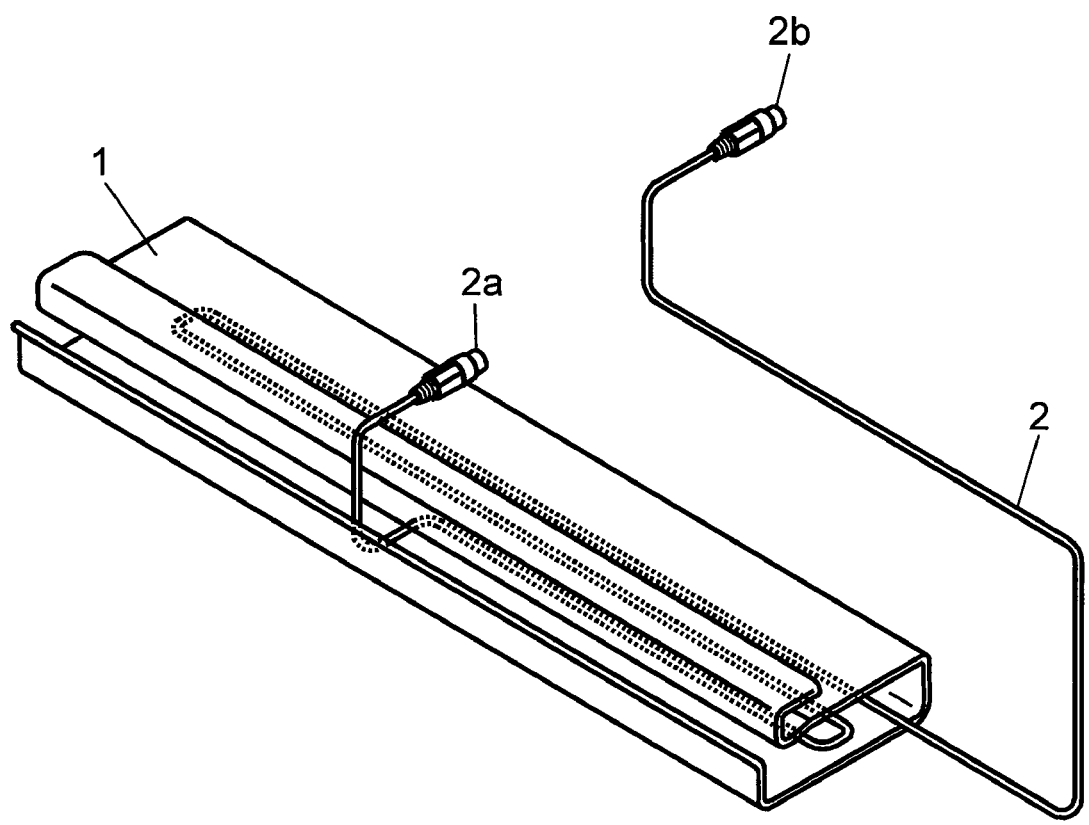
FIG. 1 is a perspective view showing a cord accommodation member and cord wiring route in the preferred embodiment 1.

1 Cord accommodation member
2 Connecting cord
2a Connection
2b Connection
3 Video equipment
4 Thin type TV
5 TV stand
6 Glass shelf
10 Fixing arm
11 Fixing rubber
11a Protruded portion
11b Fixing portion
20 Cord accommodating portion
21 Top
22 Front
23 Bottom
24 Rear
25 Projection
30 Guide

PREFERRED EMBODIMENT FOR CARRYING OUT INVENTION

The preferred embodiments of the present invention will be described in the following with reference to the drawings.

Preferred Embodiment 1

Figure 2A:
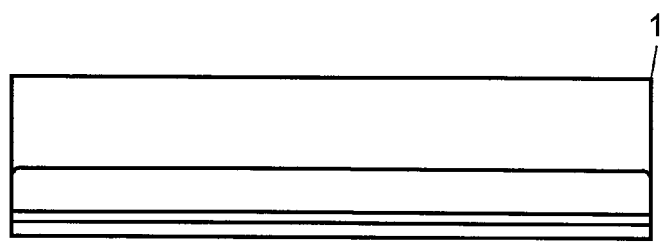
FIG. 2A is a plan view of a cord accommodation member in the preferred embodiment 1.
Figure 2B:
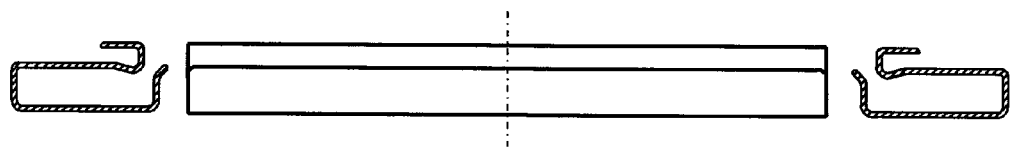
FIG. 2B is a front view, right sectional view, and left sectional view of a cord accommodation member in the preferred embodiment 1.
Figure 2C:
FIG. 2C is a bottom view of a cord accommodation member in the preferred embodiment 1.
Figure 2D:
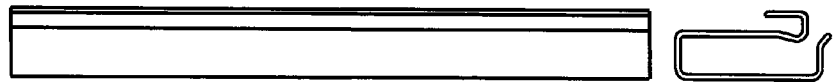
FIG. 2D is a rear view and left side view of a cord accommodation member in the preferred embodiment 1.

FIG. 1 is a perspective view of a cord accommodation member and cord wiring route in the preferred embodiment 1 of the present invention. FIG. 2A is a plan view of a cord accommodation member in the preferred embodiment 1 of the present invention. FIG. 2B is a front view, right sectional view, and left sectional view of a cord accommodation member in the preferred embodiment 1 of the present invention. FIG. 2C is a bottom view of a cord accommodation member in the preferred embodiment 1 of the present invention. FIG. 2D is a rear view and left side view of a cord accommodation member in the preferred embodiment 1 of the present invention.

Cord accommodation member 1 in the preferred embodiment 1 is installed on a glass shelf of an open type stand, in which a power cord, connecting cord 2 or the like is accommodated. The stand is mounted with a thin type TV using a flat display such as a plasma display panel and liquid crystal panel. Also, peripheral equipment such as DVD is placed on the stand. In the following description, a thin type TV is mentioned as the television used, but the present invention is not limited to a thin type TV and it can be applied to all types of TV.

As shown in FIG. 1, connection 2a to video equipment and connection 2b to TV of connecting cord 2 are exposed from cord accommodation member 1 in use.

Figure 3:
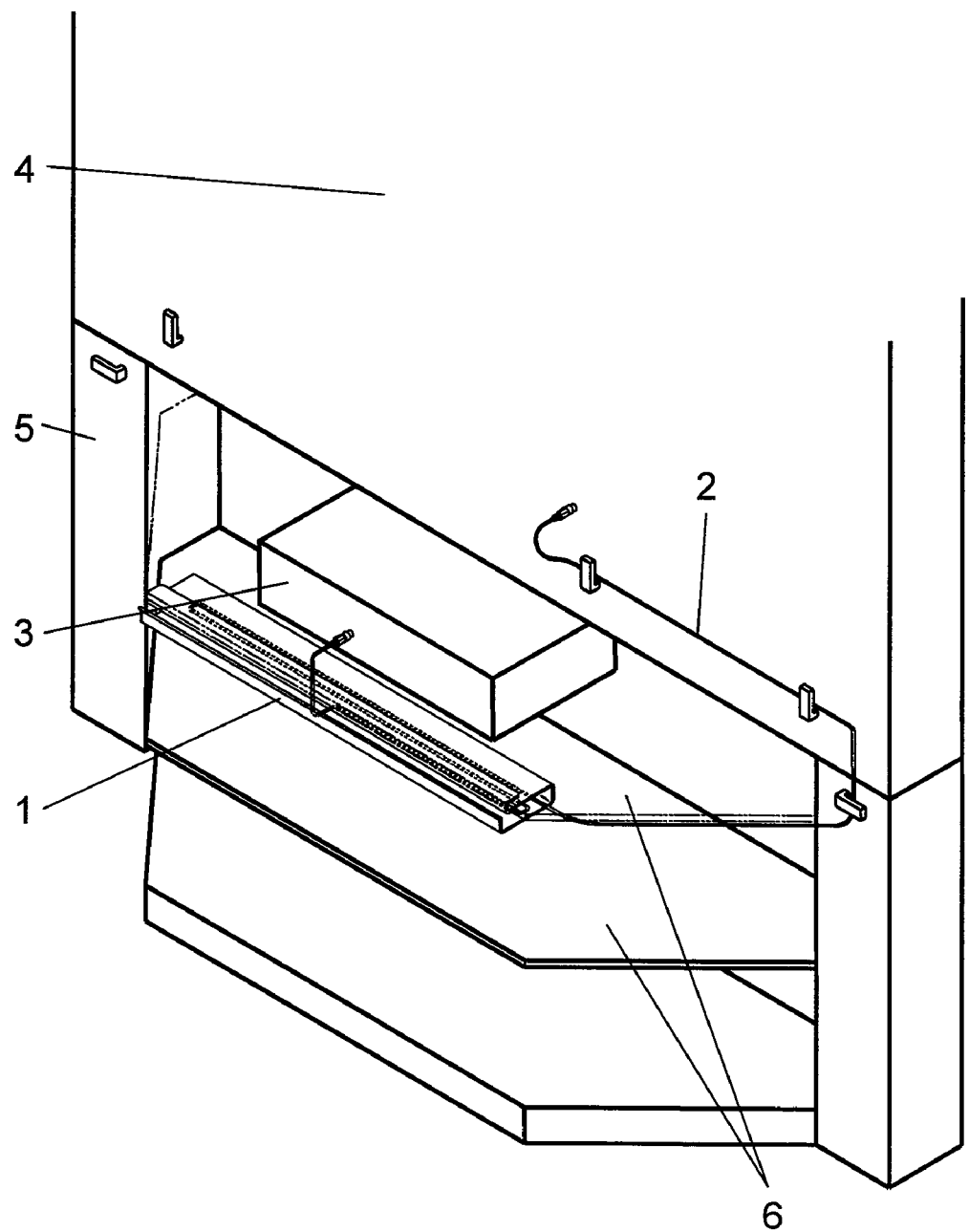
FIG. 3 is an illustration showing a thin type TV and video equipment in a state of being connected by a connecting cord accommodated in the cord accommodation member in the preferred embodiment 1.

FIG. 3 is an illustration showing thin type TV 4 and video equipment 3 in a state of being connected by a connecting cord accommodated in cord accommodation member 1 in the preferred embodiment 1 of the present invention. Connecting cord 2 from the rear side of thin type TV 4 is connected to video equipment 3 such as DVD via cord accommodation member 1. Here, video equipment 3 such as DVD is an example of peripheral equipment, and the peripheral equipment is not limited to video equipment 3 such as DVD. Connecting cord 2 from the rear side of thin type TV 4 goes to the right-hand side at the rear of main body of thin type TV 4 and passes the rear portion of the side plate at the right-hand side of TV stand 5 and then goes under glass shelf 6. Connecting cord 2 passing under glass shelf 6 is led into cord accommodation member 1 mounted on glass shelf 6, and then it is connected to video equipment 3. In this way, it is possible to make the wiring of thin type TV 4 and video equipment 3 without allowing connecting cord 2 to be visible from the front of thin type TV 4. Also, deposition of dust around the cord can be prevented by accommodating disorderly cords in cord accommodation member 1.

Figure 4A:
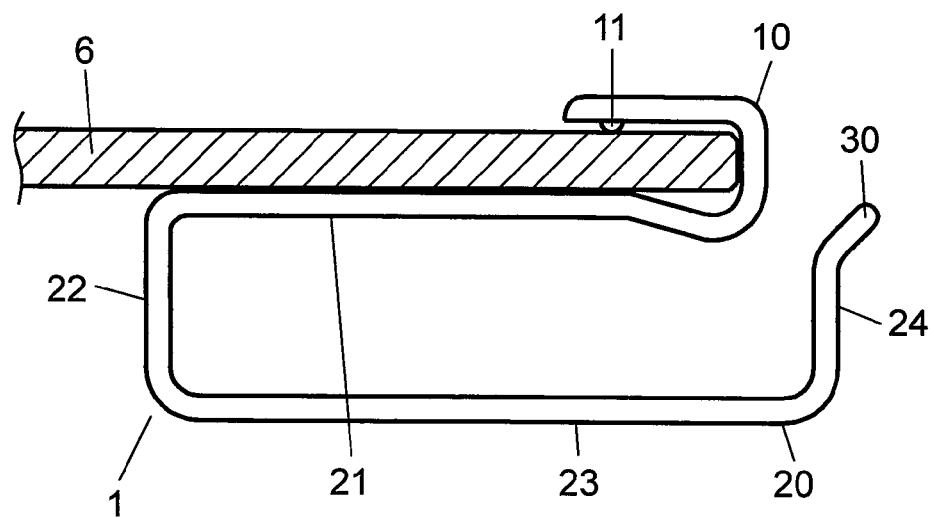
FIG. 4A is an enlarged view of the left side of the cord accommodation member in the preferred embodiment 1.

FIG. 4A is an enlarged view of the left side of cord accommodation member 1 in the preferred embodiment 1 of the present invention. FIG. 4A is an enlarged view of the left side view of FIG. 2D. As shown in FIG. 4A, cord accommodation member 1 is roughly formed of fixing arm 10, cord accommodating portion 20, and guide 30. Fixing arm 10 is a plate extending to the right and left which can be inserted from the back of glass shelf 6 of TV stand 5. Cord accommodating portion 20 serves to accommodate connecting cord 2.

Fixing arm 10 is generally shaped having a space a little larger than the thickness of glass shelf 6. Fixing arm 10 is provided with protruded fixing rubber 11 extending in the lengthwise direction of cord accommodating portion 20 on the inner surface contacting with glass shelf 6 in order to prevent falling off or loosening of cord accommodation member 1 when it is installed on glass shelf 6.

Cord accommodating portion 20 is formed of top 21, front 22, bottom 23, and rear 24. Top 21 continuously extends from fixing arm 10 and is positioned parallel to glass shelf 6. Front 22 extends from top 21 and is bent nearly at right angle to glass shelf 6. Bottom 23 extends from front 22 and is positioned nearly parallel to glass shelf 6. Rear 24 extends from bottom 23 and is bent nearly at right angle to glass shelf 6. Cord accommodating portion 20 has a rectangular space formed by top 21, front 22, bottom 23, and rear 24, and connecting cord 2 led from thin type TV 4 can be accommodated in the space.

Also, cord accommodating portion 20 is formed so as to hold glass shelf 6 in combination with fixing arm 10, which is a plate horizontally extending to support glass shelf 6 from underneath. Cord accommodating portion 20 is further extended in the forward direction from the position of fixing rubber 11 and is provided with a turning portion between fixing arm 10 and cord accommodating portion 20. In this way, fixing arm 10 and fixing rubber 11 are pulled down backward, thereby securing cord accommodating portion 20.

Guide 30 extends from rear 24 of cord accommodating portion 20 has an insertion port widened so that connecting cord 2 extending from thin type TV 4 can be easily inserted therein. Guide 30 is formed as a part of the rear of cord accommodating portion 20, which is parallel to fixing arm 10 and formed like a plate horizontally long and aslant. In this way, even when connecting cord 2 is inserted from anywhere above the rear 24, connecting cord 2 can be easily inserted. In this case, with the slanted portion of guide 30 more extended upward, it will become easier to accommodate the cord. However, from the appearance point of view, in order to make it inconspicuous as viewed from the front in particular, it is necessary to set the dimension so that guide 30 is not projected as viewed in the direction forward aslant at 45 degrees via the rear angular portion of fixing arm 10.

Fixing arm 10, cord accommodating portion 20, and guide 30 are made of plastic and connected to each other, which are formed from plastic resin such as ABS (Acrylonitrile Butadiene Styrene). ABS is excellent in mechanical strength, which is suited for cord accommodation member 1 of the present invention because it has viscosity so that the material can be bent when connecting cord 2 is inserted from guide 30 and is free from warping in extrusion molding.

Figure 4B:
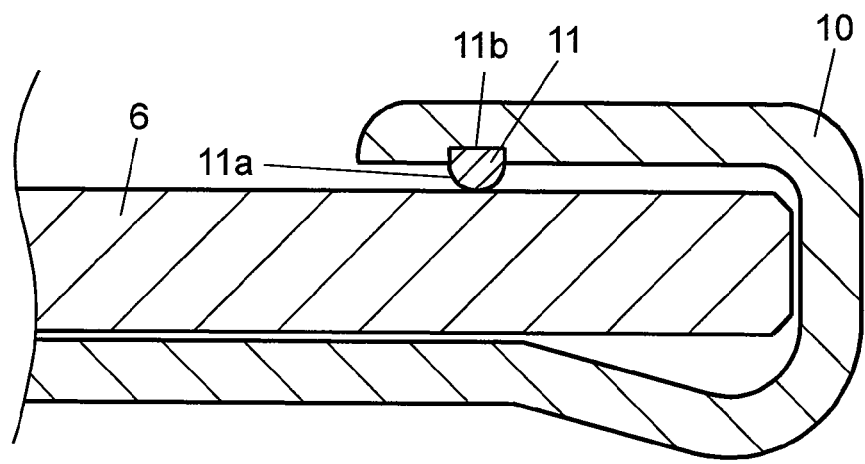
FIG. 4B is an enlarged view of the left side of the cord accommodation member in the preferred embodiment 1.

FIG. 4B is an enlarged sectional view of fixing rubber 11 of FIG. 4A and its periphery. As shown in FIG. 4B, fixing rubber 11 is formed of protruded portion 11a and fixing portion 11b. And, a part of fixing portion 11b is buried in fixing arm 10. In this way, protruded portion 11a and fixing arm 10 are fixed to each other, increasing the fastness to glass shelf 6, and also, it prevents cord accommodation member 1 from falling off due to deflection caused by aged deterioration or the weight of the member itself. In this case, in order to increase the tightness and fastness to glass shelf 6, it is preferable to use thermoplastic elastomer as fixing rubber 11, having an intermediate characteristic of rubber and plastic or both characteristics thereof, in order to increase the tightness and fastness to glass shelf 6. When a material having such characteristics is used as fixing rubber 11, it makes insertion into glass shelf 6 easier, and after insertion, frictional resistance to the glass is increased due to the characteristic of fixing rubber 11, and the accommodation member becomes hard to fall off. Also, since fixing rubber 11 is inserted in the underside of fixing arm 10, the weight of main body of cord accommodation member 1 is applied to fixing rubber 11, making cord accommodation member 1 harder to move off. In this case, the material ratio of buried fixing portion 11b and protruded portion 11a is not fixed.

The insertion force for fixing cord accommodation member 1 to glass shelf 6 and the pull-out force for detaching cord accommodation member 1 from glass shelf 6 are nearly proportional to the sidewise length of cord accommodation member 1. When the sidewise length of cord accommodation member 1 ranges from 280 to 770 mm, the insertion force is 80 to 150N, and the pull-out force is 100 to 250N. In case the insertion force or the pull-out force becomes equal to or lower than 80N, cord accommodation member 1 will be easy to move off glass shelf 6 when cord accommodation member 1 is fixed to glass shelf 6. Also, in case the insertion force or the pull-out force becomes equal to or higher than 250N, it will be unable to easily attach or detach cord accommodation member 1 to or from glass shelf 6. Therefore, the insertion force or pull-out force of cord accommodation member 1 is preferable to range from 80 to 250N. Also, when one piece of fixing rubber 11 is used as shown in FIG. 4A and FIG. 4B, the sidewise length of cord accommodation member 1 is preferable to range from 280 to 770 mm.

Fixing rubber 11 can be fitted to fixing arm 10 for example by the following method. That is, when fixing arm 10 and cord accommodating portion 20 are formed by extrusion molding such as injection molding, thermoplastic elastomer is simultaneously extruded so that ABS and elastomer are chemically bonded to each other, and thereby, fixing portion 11b of fixing rubber 11 and fixing arm 10 are integrated. In this way, it is possible to increase the bonding force for fixing arm 10 and fixing portion 11b requiring the highest strength at the time of insertion and removal. The principle is that plastic material is thrown into the extruder for cord accommodating portion 20, and the plastic material is delivered into a heating cylinder by means of a screw where the material is heated and fluidized. When the heated and fluidized plastic material is passed through a die having material passage section hole at the end, thermoplastic elastomer is simultaneously extruded from a part of the die to be given a shape, and then cooled and hardened by water or air. In this way, long cord accommodation member 1 can be manufactured. Also, by changing the shape of the material passage section hole at the end, cord accommodation member 1 having various section shapes can be manufactured, and by injecting the thermoplastic elastomer intermittently, it is possible to regulate the insertion force and pull-out force.

The function of cord accommodation member 1 in the preferred embodiment 1 will be further described in the following. As shown in FIG. 1 and FIG. 3, the wiring route of cord accommodation member 1 is such that connecting cord 2 is inserted into the right and left openings and taken out from the middle portion and connected to video equipment 3 such as DVD as described above.

Also, as shown in FIG. 2A to FIG. 2D, cord accommodation member 1 is symmetrical as shown in the right side view and the left side view of FIG. 2B and has a laterally long cylindrical shape. Therefore, fixing arm 10 and fixing rubber 11 are able to sufficiently support one side of the whole of glass shelf 6. In addition, since guide 30 is formed anywhere in the rear position, it is possible to take out or insert connecting cord 2 from any position.

Conventionally, the die has been raised in order to cope with the development of various types different in sidewise width such as 58 type, 50 type, 42 type, and 37 type. However, since cord accommodation member 1 of the present invention can be manufactured in same sectional shape and desired length, cord accommodating portion 20 can be formed by extrusion molding without raising the die in order to cope with the development of various types different in sidewise width such as 58 type, 50 type, 42 type, and 37 type. In this way, it brings about such an advantage that cord accommodation member 1 of the present invention can be cut in lengths to cope with various types.

When cord accommodation member 1 is cut, the end surface has cut marks, and the end surface is heat-treated to eliminate such cut marks. The heat treatment of cut surfaces is performed by pressing cord accommodation member 1 against a metal plate heated at 162 to 168° C. for 3 to 5 sec. under pressure ranging from 0.2 to 0.3 kg. The end surface of cord accommodation member 1 made of ABS is locally dissolved due to the temperature 162 to 168° C. of the metal plate and formed flat by the surface of the metal plate in 3 to 5 sec. under the pressure of 0.2 to 0.3 kg.

Figure 5A:
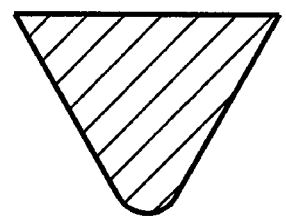
FIG. 5A is a sectional view of another protruded shape of fixing rubber in the preferred embodiment 1.
Figure 5B:
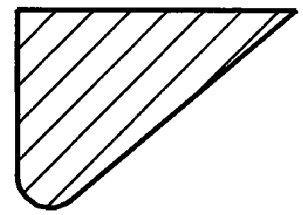
FIG. 5B is a sectional view of further another protruded shape of fixing rubber in the preferred embodiment 1.
Figure 5C:
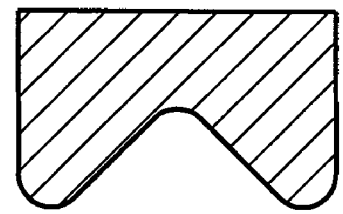
FIG. 5C is a sectional view of still another protruded shape of fixing rubber in the preferred embodiment 1.
Figure 5D:
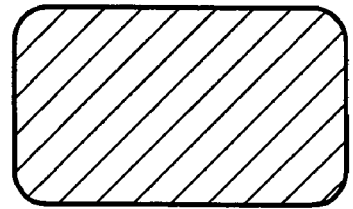
FIG. 5D is a sectional view of further another protruded shape of fixing rubber in the preferred embodiment 1.

In the above description, the shape of protruded portion 11a of fixing rubber 11 is semi-circular as shown in FIG. 4B. However, the shape of protruded portion 11a is not limited to semi-circular. The shape of protruded portion 11a is allowable to be as shown in FIG. 5A to FIG. 5D. The shape of protruded portion 11a in FIG. 5A is equilateral triangles, the shape of protruded portion 11a in FIG. 5B is right triangles, the shape of protruded portion 11a in FIG. 5C is M-shaped, and the shape of protruded portion 11a in FIG. 5D is rectangular. In these cases, the features are as described in the following. In case the shape of protruded portion 11a is equilateral triangles, it is easy to attach or detach cord accommodation member 1 because of being less in area of contact with glass shelf 6. In case the shape of protruded portion 11a is right triangles, it is hard to attach cord accommodation member 1 to glass shelf 6 but easy to detach therefrom. In case the shape of protruded portion 11a is M-shaped, it is easier to attach or detach cord accommodation member 1 because of being less in contact area as compared with the case the shape of protruded portion 11a is right triangles. In case the shape of protruded portion 11a is rectangular, it stabilizes the retaining force after insertion of cord accommodation member 1.

Figure 6:
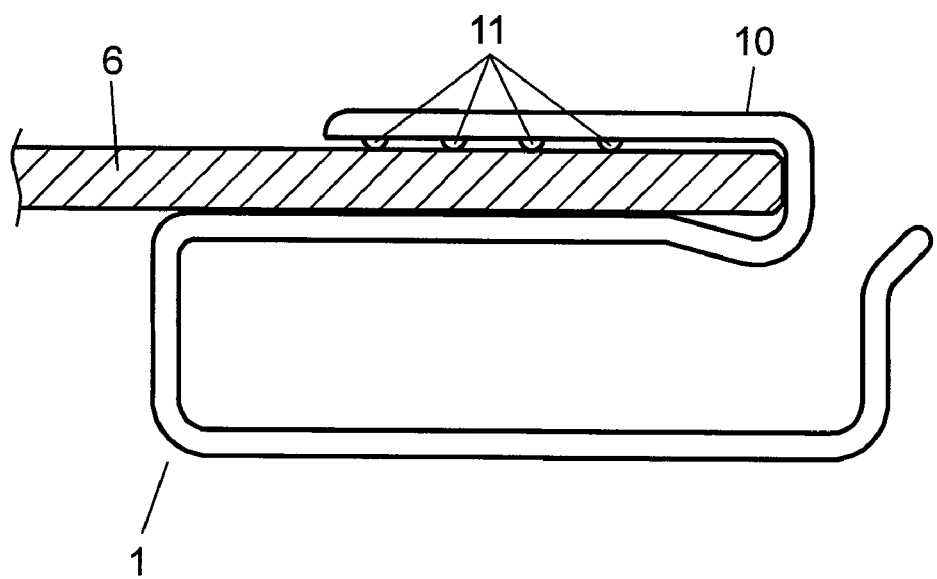
FIG. 6 is an enlarged view of the left side of the cord accommodation member with increased fixing rubbers in the preferred embodiment 1.

Also, in the above description, when the sidewise length of cord accommodation member 1 is 280 to 770 mm, one piece of fixing rubber 11 is used as shown in FIG. 4A and FIG. 4B. FIG. 6 is an enlarged sectional view of fixing rubber 11 and its periphery when the sidewise length of cord accommodation member 1 is equal to or less than 280 mm. In case the sidewise length of cord accommodation member 1 is equal to or less than 280 mm, the number of fixing rubbers 11 is allowable to be a plurality of pieces, that is, two or more. In that case, the place where fixing rubbers 11 are arranged can be obtained by extending fixing arm 10 in the forward direction. In this way, it is possible to increase the retaining force between fixing rubber 11 and glass shelf 6 by increasing the number of fixing rubbers 11. Accordingly, even in case the sidewise length of cord accommodation member 1 is equal to or less than 280 mm, it is possible to assure 80 to 250N of forces for inserting cord accommodation member 1 into glass shelf 6. For example, when the sidewise length of cord accommodation member 1 is 150 mm, the force for inserting the member into glass shelf 6 is 40N in using one piece of fixing rubber 11, but by using a plurality of fixing rubbers 11, equal to or higher 80N of forces can be obtained for insertion and removal. The forces for inserting cord accommodation member 1 into glass shelf 6 or for removing it from glass shelf 6 can be set to 80N in the case of using 2 pieces of fixing rubber 11, 120N in the case of using 3 pieces of fixing rubber 11, and 160N in the case of using 4 pieces of fixing rubber 11.

Figure 7:
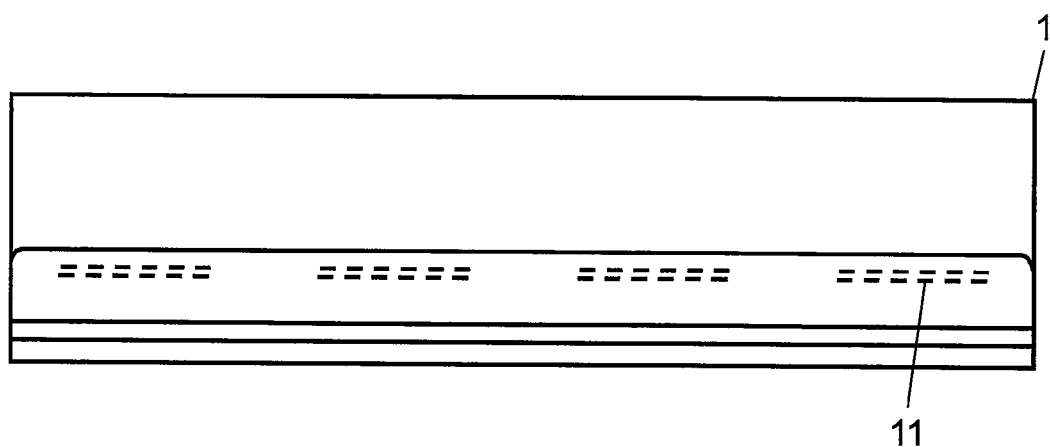
FIG. 7 is a plan view of the cord accommodation member with fixing rubbers discontinuously disposed in the preferred embodiment 1.

Also, in the above description, when the sidewise length of cord accommodation member 1 ranges from 280 to 770 mm, as shown in FIG. 4A and FIG. 4B, one piece of continuous rubber is used as fixing rubber 11. FIG. 7 is an enlarged sectional view of fixing rubber 11 and its periphery when the sidewise length of cord accommodation member 1 is equal to or over 770 mm. In case the sidewise length of cord accommodation member 1 is equal to or over 770 mm, fixing rubber 11 is allowable to be discontinuous as shown in FIG. 7. In forming cord accommodation member 1, it is possible to make fixing rubber 11 like a discontinuous dotted line by performing the injection and stop of the material for injection molding of fixing rubber 11 at a predetermined interval and predetermined ratio. Making fixing rubber 11 discontinuous, it is possible to reduce the retaining force between fixing rubber 11 and glass shelf 6. As a result, even in case the sidewise length of cord accommodation member 1 is equal to or over 770 mm, the pull-out force for detaching cord accommodation member 1 from glass shelf 6 can be kept equal to or lower than 250N. For example, when the sidewise length of cord accommodation member 1 is 1000 mm, the pull-out force is 350N in case fixing rubber 11 is continuous. In the case of making fixing rubber 11 discontinuous, the pull-out force for removing fixing rubber 11 from glass shelf 6 is as follows. When the ratio of fixing rubber length to cord accommodation member 1 is 70%, the pull-out force for removing fixing rubber 11 from glass shelf 6 is 245N. When the ratio of fixing rubber length to cord accommodation member 1 is 50%, the pull-out force for removing fixing rubber 11 from glass shelf 6 is 175N. When the ratio of fixing rubber length to cord accommodation member 1 is 30%, the pull-out force for removing fixing rubber 11 from glass shelf 6 is 105N. Thus, it is possible to keep the pull-out force equal to or less than 250N by making fixing rubber 11 like a discontinuous dotted line.

As described above, in the cord accommodation member of the present invention, changing the shape of protruded portion 11a of fixing rubber 11 and the number of fixing rubbers 11, continuity of fixing rubber 11, and in combination of these, it is possible to cope with various applications by changing the shape even in case of variation of the installing place or the forces required for insertion and removal.

Figure 8:
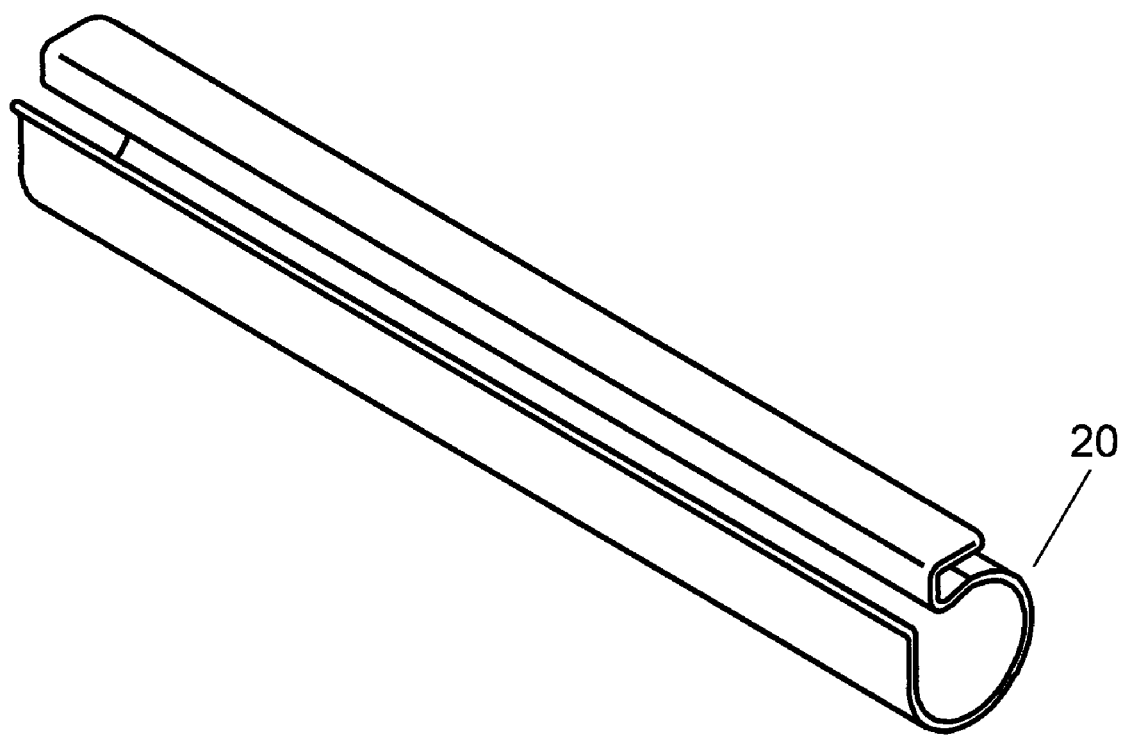
FIG. 8 is a perspective view in other shape of the cord accommodation member in the preferred embodiment 1.

FIG. 8 shows cord accommodating portion 20 having a circular shape. In the above description, the shape of cord accommodating portion 20 is rectangular as shown in FIG. 1, but cord accommodating portion 20 is allowable to have other shapes such as circular or triangular shapes depending upon the accommodation capacity and place as shown in FIG. 8.

Also, making the color tone of cord accommodation member 1 and fixing rubber 11 transparent, it is possible to make the appearance of fixing arm 10 more inconspicuous.

In cord accommodation member 1 described above, connecting cord 2 is visible to the user through cord accommodating portion 20 as cord accommodation member 1 is transparent. That is, connecting cord 2 is visible at the left-hand side of FIG. 4A.

Figure 9:
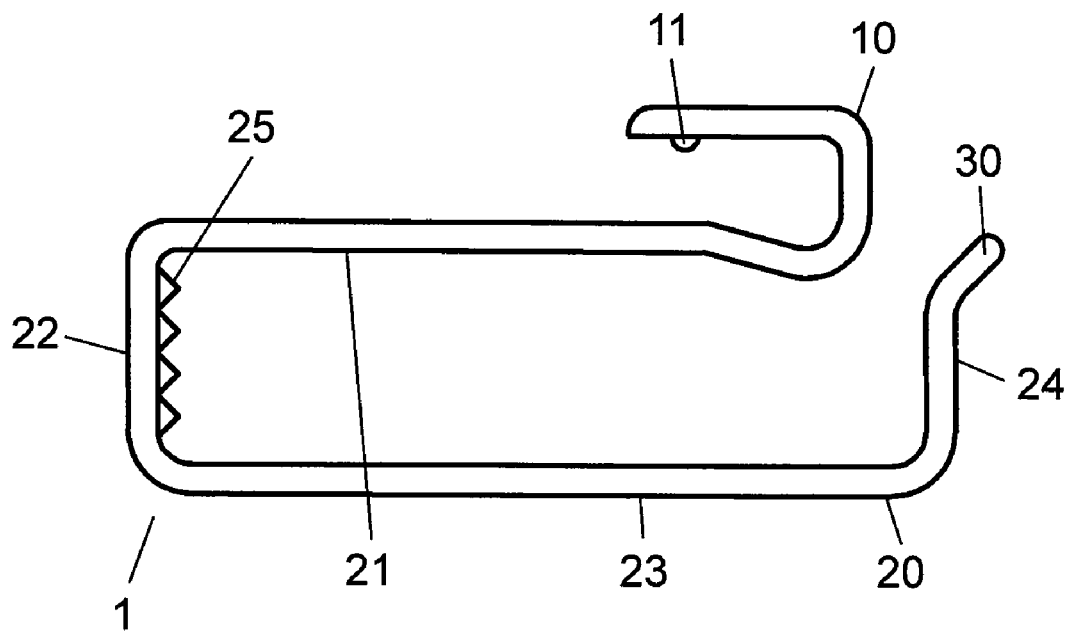
FIG. 9 is an enlarged view of the left side of other cord accommodation member in the preferred embodiment 1.

And, FIG. 9 is an enlarged view of the left-hand side of cord accommodation member 1 where connecting cord 2 is invisible to the user through cord accommodating portion 20 even in case cord accommodation member 1 is transparent.

The difference of cord accommodation member 1 of FIG. 9 from cord accommodation member 1 of FIG. 4A is triangular projection 25. Since it is same as FIG. 4A except triangular projection 25, the description is omitted, and projection 25 is mainly described in the following.

As shown in FIG. 9, a plurality of triangular projections 25 are laterally formed on the inner surface of front 22 in order to make connecting cord 2 invisible. Due to triangular projection 25, the reflection from connecting cord 2 is scattered about so that connecting cord 2 becomes invisible.

In installation of the accommodation member on the stand, the wiring for connecting a thin type TV to video equipment is made from the right and left portions of the cord accommodation member by passing the cord led from the rear of the thin type TV beneath the glass shelf from the back of the rear plate of the TV stand, and the cord is connected from under the rear of the video equipment, and thereby, the user in front of the thin type TV will never see the wiring.

As is obvious in the above description, according to the cord accommodation member and its manufacturing method of the present invention, the connecting cord of the thin type TV and video equipment can be accommodated in a hidden place under the glass shelf. Also, forming the member structurally hard to fall off and the accommodating portion by extrusion molding, it is able to cope with the development of various types different in sidewise width such as 58 type, 50 type, 42 type, and 37 type. That is, cutting it in the desired size for each type, it is possible to reduce the number of dies and types.

Also, in the cord accommodation member of the present invention, the wiring from the right and left portions of the cord accommodation member can be made by passing the cord led from the rear of the thin type TV beneath the glass shelf from the back of the side plate of the stand, and the cord can be connected from under the rear of the video equipment. In this way, the wiring is invisible to the user watching the thin type TV and will not spoil the beauty.

INDUSTRIAL APPLICABILITY

In the cord accommodation member of the present invention, the wiring from the right and left portions of the cord accommodation member is made by passing the cord led from the rear of the thin type TV beneath the glass shelf from the back of the side plate of the stand, and the cord is connected from under the rear of the video equipment. In this way, since the wiring is invisible to the user watching the thin type TV and it is possible to avoid spoiling the beauty, it is useful to be used in the field of attachments of a thin type TV and the like.

The invention claimed is:

1. A cord accommodation member for accommodating a connecting cord for connecting between a television and a video equipment, comprising:
    a cord accommodating portion for accommodating the connecting cord;
    a fixing arm for fixing the cord accommodating portion, which is attached to a glass shelf of a TV stand on which the television and the video equipment are mounted; and
    a fixing rubber for increasing force of fixing between the glass shelf and the fixing arm,
    wherein the cord accommodating portion, resin of the fixing arm, and the fixing rubber are simultaneously formed by injection molding,
    wherein the fixing rubber includes:
    a fixing portion buried in the fixing arm, and
    a protruded portion contacted to the glass shelf.

2. A cord accommodation member for accommodating a connecting cord for connecting between a television and a video equipment, comprising:
    a cord accommodating portion for accommodating the connecting cord;
    a fixing arm for fixing the cord accommodating portion, which is attached to a glass shelf of a TV stand on which the television and the video equipment are mounted; and
    a fixing rubber for increasing force of fixing between the glass shelf and the fixing arm,
    wherein the cord accommodating portion, resin of the fixing arm, and the fixing rubber are simultaneously formed by injection molding,
    wherein a plurality of the fixing rubbers are disposed when at least one of insertion force and pull-out force is equal to or lower than 80N in one piece of the fixing rubber.

3. A cord accommodation member for accommodating a connecting cord for connecting between a television and a video equipment, comprising:
    a cord accommodating portion for accommodating the connecting cord;
    a fixing arm for fixing the cord accommodating portion, which is attached to a glass shelf of a TV stand on which the television and the video equipment are mounted; and
    a fixing rubber for increasing force of fixing between the glass shelf and the fixing arm,
    wherein the cord accommodating portion, resin of the fixing arm, and the fixing rubber are simultaneously formed by injection molding
    wherein the fixing rubber is discontinuous when at least one of the insertion force and the pull-out force is equal to or higher than 250N in one continuous piece of the fixing rubber.

4. A manufacturing method for a cord accommodation member for accommodating a connecting cord for connecting between a television and a video equipment, further comprising:
    forming simultaneously a cord accommodating portion of the cord accommodation member, resin of a fixing arm, and a fixing rubber by injection molding, and
    cutting the cord accommodation member formed by injection molding in a predetermined length.

5. The manufacturing method for a cord accommodation member of claim 4, comprising:
    heating the cut end surface of the cord accommodation member by pressing against a metal plate heated at 162 to 168° C. under a pressure of 0.2 to 0.3 kg for 3 to 5 seconds.

6. The manufacturing method for a cord accommodation member of claim 4, wherein fixing rubber is discontinuously injected in the step of the injection molding.

* * * * *